(12) United States Patent
Natsui et al.

(10) Patent No.: US 11,923,529 B2
(45) Date of Patent: Mar. 5, 2024

(54) POSITIVE ELECTRODE ACTIVE MATERIAL AND BATTERY INCLUDING SAME

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 614 days.

(21) Appl. No.: 17/165,951

(22) Filed: Feb. 3, 2021

(65) Prior Publication Data

US 2021/0167357 A1    Jun. 3, 2021

Related U.S. Application Data

(63) Continuation of application No. PCT/JP2019/017895, filed on Apr. 26, 2019.

(30) Foreign Application Priority Data

Sep. 5, 2018  (JP) ................................ 2018-166356

(51) Int. Cl.
*H01M 4/131* (2010.01)
*C01G 53/00* (2006.01)
(Continued)

(52) U.S. Cl.
CPC ............ *H01M 4/131* (2013.01); *C01G 53/50* (2013.01); *H01M 4/134* (2013.01); *H01M 4/364* (2013.01);
(Continued)

(58) Field of Classification Search
None
See application file for complete search history.

(56) References Cited

U.S. PATENT DOCUMENTS

| | | | |
|---|---|---|---|
| 9,249,034 B2 | 2/2016 | Yamamoto et al. | |
| 2016/0028072 A1* | 1/2016 | Sakai | H01M 4/525 |
| | | | 429/223 |

(Continued)

FOREIGN PATENT DOCUMENTS

| | | |
|---|---|---|
| JP | 2017-027881 A | 2/2017 |
| WO | 2014/192759 | 12/2014 |

OTHER PUBLICATIONS

Indian Examination Report dated Sep. 21, 2022 for the related Indian Patent Application No. 202147005248.

(Continued)

*Primary Examiner* — Alix E Eggerding
(74) *Attorney, Agent, or Firm* — Rimon P.C.

(57) ABSTRACT

A positive electrode active material according to the present disclosure includes a lithium composite oxide that contains first particles having a crystal structure belonging to space group R-3m and second particles having a crystal structure belonging to space group C2/m. The crystal structure of the second particles has a larger amount of cation mixing than the crystal structure of the first particles. The second particles have a smaller particle size than the first particles. Mathematical Formula $0.05 \leq$ integrated intensity ratio $I_{(18°-20°)}/I_{(43°-46°)} \leq 0.99$ is satisfied. The integrated intensity ratio $I_{(18°-20°)}/I_{(43°-46°)}$ is a ratio of the integrated intensity $I_{(18°-20°)}$ to the integrated intensity $I_{(43°-46°)}$. The integrated intensity $I_{(A°-B°)}$ is the integrated intensity of a maximum peak present in the range of angle of diffraction 2θ greater than or equal to A° and less than or equal to B° in the X-ray diffraction pattern of the lithium composite oxide.

19 Claims, 3 Drawing Sheets

(51) Int. Cl.
      *H01M 4/134*     (2010.01)
      *H01M 4/36*      (2006.01)
      *H01M 4/505*     (2010.01)
      *H01M 4/525*     (2010.01)
      *H01M 4/02*      (2006.01)

(52) U.S. Cl.
      CPC ........... H01M 4/505 (2013.01); H01M 4/525 (2013.01); *C01P 2002/74* (2013.01); *H01M 2004/028* (2013.01)

(56) References Cited

U.S. PATENT DOCUMENTS

| | | | |
|---|---|---|---|
| 2016/0056462 A1 | 2/2016 | Sakai et al. | |
| 2020/0075936 A1* | 3/2020 | Tsujita | H01M 4/628 |
| 2020/0266436 A1* | 8/2020 | Sakai | H01M 4/505 |
| 2020/0388823 A1* | 12/2020 | Omae | H01M 4/505 |
| 2021/0143424 A1* | 5/2021 | Uchida | H01M 10/0562 |

OTHER PUBLICATIONS

International Search Report of PCT application No. PCT/JP2019/017895 dated Jul. 16, 2019.

* cited by examiner

POSITIVE ELECTRODE ACTIVE MATERIAL AND BATTERY INCLUDING SAME

BACKGROUND

1. Technical Field

The present disclosure relates to a positive electrode active material and a battery including the positive electrode active material.

2. Description of the Related Art

WO 2014/192759 discloses a lithium composite transition metal oxide having a chemical composition represented by general formula $Li_aMO_x$ (where M is an element including at least one element selected from a Ni element, a Co element, and a Mn element). In the X-ray diffraction pattern of the lithium composite transition metal oxide, the ratio ($I_{020}/I_{003}$) of the integrated intensity ($I_{020}$) of the peak from the (020) plane belonging to a crystal structure of space group C2/m to the integrated intensity ($I_{003}$) of the peak from the (003) plane belonging to a crystal structure of space group R-3m is 0.02 to 0.3.

SUMMARY

One non-limiting and exemplary embodiment provides a positive electrode active material used for high-capacity batteries.

In one general aspect, the techniques disclosed here feature a positive electrode active material including a lithium composite oxide. The lithium composite oxide contains first particles having a crystal structure belonging to space group R-3m, and second particles having a crystal structure belonging to space group C2/m. The crystal structure of the second particles has a larger amount of cation mixing than the crystal structure of the first particles. The second particles have a smaller particle size than the first particles. The following mathematical formula (I) is satisfied: $0.05 \leq$ integrated intensity ratio $I_{(18°\text{-}20°)}/I_{(43°\text{-}46°)} \leq 0.99$ (I). The integrated intensity ratio $I_{(18°\text{-}20°)}/I_{(43°\text{-}46°)}$ is a ratio of the integrated intensity $I_{(18°\text{-}20°)}$ to the integrated intensity $I_{(43°\text{-}46°)}$. The integrated intensity $I_{(43°\text{-}46°)}$ is an integrated intensity of a first peak that is a maximum peak present in a range of angle of diffraction 2θ greater than or equal to 43° and less than or equal to 46° in the X-ray diffraction pattern of the lithium composite oxide. The integrated intensity $I_{(18°\text{-}20°)}$ is an integrated intensity of a second peak that is a maximum peak present in a range of angle of diffraction 2θ greater than or equal to 18° and less than or equal to 20° in the X-ray diffraction pattern of the lithium composite oxide.

The present disclosure provides a positive electrode active material for achieving high-capacity batteries. The present disclosure also provides a battery including a positive electrode containing the positive electrode active material, a negative electrode, and an electrolyte. The battery has a high capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
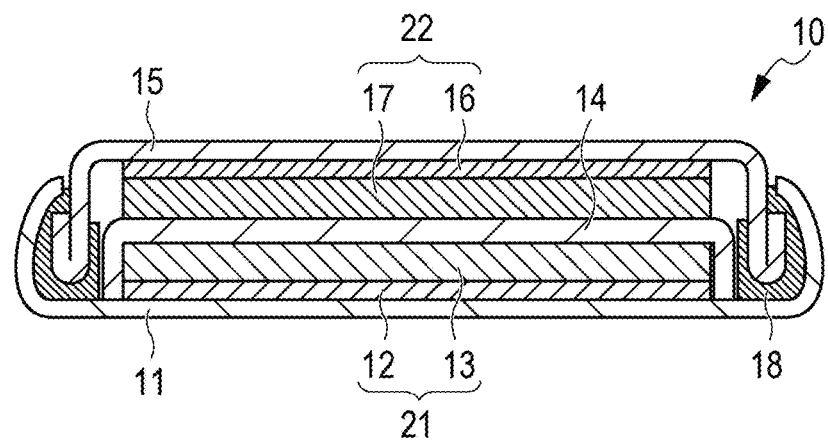
FIG. 1 is a cross-sectional view of a battery 10 in a second embodiment.

Embodiments of the present disclosure will be described below.

First Embodiment

A positive electrode active material in a first embodiment includes a lithium composite oxide.

The lithium composite oxide contains first particles having a crystal structure belonging to space group R-3m, and second particles having a crystal structure belonging to space group C2/m.

The crystal structure of the second particles has a larger amount of cation mixing than the crystal structure of the first particles.

The second particles have a smaller particle size than the first particles.

The following mathematical formula (I) is satisfied:

$$0.05 \leq \text{integrated intensity ratio } I_{(18°\text{-}20°)}/I_{(43°\text{-}46°)} \leq 0.99 \quad (I).$$

The integrated intensity ratio $I_{(18°\text{-}20°)}/I_{(43°\text{-}46°)}$ is a ratio of the integrated intensity $I_{(18°\text{-}20°)}$ to the integrated intensity $I_{(43°\text{-}46°)}$.

The integrated intensity $I_{(43°\text{-}46°)}$ is an integrated intensity of a first peak that is a maximum peak present in a range of angle of diffraction 2θ greater than or equal to 43° and less than or equal to 46° in the X-ray diffraction pattern of the lithium composite oxide.

The integrated intensity $I_{(18°\text{-}20°)}$ is an integrated intensity of a second peak that is a maximum peak present in a range of angle of diffraction 2θ greater than or equal to 18° and less than or equal to 20° in the X-ray diffraction pattern of the lithium composite oxide.

The positive electrode active material according to the first embodiment is used to improve the capacity of the battery.

A lithium-ion battery including the positive electrode active material in the first embodiment has a redox potential (based on Li/Li$^+$) of about 3.4 V. The lithium-ion battery has a capacity greater than or equal to about 269 mAh/g In the first embodiment, as described above, the lithium composite oxide contains first particles having a crystal structure belonging to space group R-3m and second particles having a crystal structure belonging to space group C2/m. In other words, the lithium composite oxide is a multi-phase mixture including a first phase having a crystal structure belonging to space group R-3m and a second phase having a crystal structure belonging to space group C2/m. The first phase is formed of the first particles, and the second phase is formed of the second particles.

The crystal structure belonging to space group C2/m has a structure in which Li layers and transition metal layers are alternately stacked on top of one another. The transition metal layer may contain Li in addition to transition metals. Thus, a larger amount of Li is intercalated into the crystal structure belonging to space group C2/m than that into $LiCoO_2$ which is a commonly used conventional material.

However, if the transition metal layer is formed only of the crystal structure belonging to space group C2/m, the capacity may drop during quick charging because of high Li migration barrier (e.g., low Li diffusivity) in the transition metal layer.

The crystal structure belonging to space group R-3m also has a structure in which Li layers and transition metal layers are alternately stacked on top of one another. However, the crystal structure belonging to space group R-3m has two-dimensional Li diffusion paths. Thus, the crystal structure belonging to space group R-3m has high Li diffusivity.

In the first embodiment, a high-capacity battery is provided because the lithium composite oxide contains the first phase having a crystal structure belonging to space group R-3m and the second phase having a crystal structure belonging to space group C2/m. The battery may be suitable for quick charging.

In the lithium composite oxide contained in the positive electrode active material in the first embodiment, multiple regions formed of the first phase and multiple regions formed of the second phase may be arranged randomly in three dimensions. In other words, the first particles and the second particles may be arranged randomly in the lithium composite oxide.

The three-dimensional random arrangement provides large three-dimensional Li diffusion paths and enables insertion and extraction of a larger amount of Li. As a result, the battery has a high capacity.

In the first embodiment, the lithium composite oxide is a multi-phase mixture. For example, a multi-layer structure including a bulk layer and a coat layer covering the bulk layer does not correspond to the multi-phase mixture in the present disclosure. The multi-phase mixture means a substance containing multiple phases. During manufacture of the lithium composite oxide, two or more materials corresponding to multiple phases may be mixed.

The integrated intensity ratio $I_{(18°-20°)}/I_{(43°-46°)}$ is greater than or equal to 0.05 and less than or equal to 0.99.

The integrated intensity ratio $I_{(18°-20°)}/I_{(43°-46°)}$ is a parameter that may be an indicator of cation mixing in the lithium composite oxide in the first embodiment. The "cation mixing" in the present disclosure refers to the state in which lithium ions are substituted with transition metal cations in the crystal structure of the lithium composite oxide. As the cation mixing decreases, the integrated intensity ratio $I_{(18°-20°)}/I_{(43°-46°)}$ increases. As the cation mixing increases, the integrated intensity ratio $I_{(18°-20°)}/I_{(43°-46°)}$ decreases.

If the integrated intensity ratio $I_{(18°-20°)}/I_{(43°-46°)}$ is greater than 0.99, cation mixing is unlikely to occur. This promotes rearrangement of atoms when Li is excessively extracted and reduces three-dimensional Li diffusion paths. As a result, the Li diffusivity decreases, and the energy density decreases.

If the integrated intensity ratio $I_{(18°-20°)}/I_{(43°-46°)}$ is less than 0.05, the crystal structure is unstable. As a result, the crystal structure collapses as a result of Li extraction during charging, and the energy density decreases.

In the first embodiment, the lithium composite oxide has an integrated intensity ratio $I_{(18°-20°)}/I_{(43°-46°)}$ greater than or equal to 0.05 and less than or equal to 0.99, so that cation mixing may occur adequately. This may result in an increase in three-dimensional lithium diffusion paths. As a result, the battery has a higher capacity.

To further improve the capacity of the battery, the integrated intensity ratio $I_{(18°-20°)}/I_{(43°-46°)}$ may be greater than or equal to 0.62 and less than or equal to 0.99.

To further improve the capacity of the battery, the integrated intensity ratio $I_{(18°-20°)}/I_{(43°-46°)}$ may be greater than or equal to 0.75 and less than or equal to 0.95.

In the first embodiment, as described above, the lithium composite oxide contains two types of particles (i.e., first particles and second particles) having different crystal structures and different sizes from each other. The first particles and the second particles can be observed with, for example, a transmission electron microscope (hereinafter "TEM"). The particle sizes of the first particles and the second particles can be measured by observing the cross-section of the first particles and the second particles using, for example, a scanning electron microscope (hereinafter "SEM"). Specifically, the SEM image may be acquired by observing the cross-section of a particle, and the maximum diameter of the particle measured on the basis of the SEM image may be obtained as a particle size.

The particle sizes of the first particles and the second particles are not limited. The particle sizes of the first particles may be greater than or equal to 30 nanometers. For example, each first particle may have a particle size greater than or equal to 30 nanometers, and each second particle may have a particle size less than 30 nanometers. The upper limit of the particle sizes of the first particles is not limited but may be less than or equal to 500 nanometers. The lower limit of the particle sizes of the second particles is not limited but may be greater than or equal to 2 nanometers.

The space groups of the crystal structures of the first particles and the second particles can be specified by observing the electron diffraction pattern by a known technique using electron diffraction measurement with a TEM. It can accordingly be confirmed that the lithium composite oxide has the first particles having a crystal structure belonging to space group R-3m and the second particles having a crystal structure belonging to space group C2/m in the first embodiment.

The amount of cation mixing in the second particles is greater than the amount of cation mixing in the first particles. A difference in amount of cation mixing between the first particles and the second particles can be determined by atomic resolution observation with the TEM. Specifically, a difference in amount of cation mixing may be determined on the basis of the grayscale of the image showing the result of atomic resolution observation with the TEM.

The amount of cation mixing in the first particles and the second particles may be specified by, for example, comparison between atomic resolution analysis and simulation. For example, the amount of cation mixing can be specified by using the ratio of the intensity of Li portions normalized by the intensity of transition metal portions in the intensity profile of the HAADF-STEM image. The amount of cation mixing in the first particles and the second particles is not limited. The amount of cation mixing in the first particles may be less than or equal to 10%. The amount of cation mixing in the second particles may be less than or equal to 30%.

In the first embodiment, as described above, the lithium composite oxide is a multi-phase mixture containing first particles and second particles having different particle sizes from each other. By mixing the first particles and the second particles having different particle sizes from each other, the filling ability of the positive electrode active material in the positive electrode can be improved. As a result, the battery has a higher capacity. The amount of cation mixing in the first particles having a large particle size is less than the amount of cation mixing in the second particles having a small particle size. For example, small size particles exhibiting small volume changes and having a large amount of cation mixing are disposed in gaps between large size particles exhibiting large volume changes and having a small amount of cation mixing. The small size particles thus function as a buffer. As a result, expansion and shrinkage of a positive electrode plate during Li extraction and insertion can be suppressed by the small size particles, and the battery has good cycle characteristics.

As described above, the filling ability of the positive electrode active material is improved by the presence of large size particles (i.e., first particles) and small size particles (i.e., second particles) in the lithium composite oxide. When a high charging voltage is applied to the particles forming the positive electrode active material, the surfaces of the particles deteriorate as a result of the progress of the side reaction. The deterioration of the surfaces of the particles degrades the performance of the battery. The influence of the deterioration of the surfaces on the performance of the battery increases as the particles sizes of the particles decrease. In other words, when the positive electrode active material contains the small size particles, the battery tends to have poor cycle characteristics and may have a short life. In the first embodiment, however, the amount of cation mixing in the small size particles (i.e., the second particles) is large, so that the surfaces of the particles are unlikely to deteriorate when a high charging voltage is applied to the lithium composite oxide. As a result, the battery has a high capacity. Therefore, the lithium composite oxide may be used to provide a long-life battery having a large capacity and good cycle characteristics in the first embodiment although the lithium composite oxide contains small size particles.

To stabilize the crystal structure of the lithium composite oxide, the lithium composite oxide may contain at least one element selected from the group consisting of F, Cl, N, and S in the first embodiment. At least either the first particles or the second particles contained in the lithium composite oxide may contain at least one element selected from the group consisting of F, Cl, N, and S.

Some of oxygen atoms of the lithium composite oxide may be substituted with electrochemically inactive anions. In other words, some of oxygen atoms may be substituted with at least one anion selected from the group consisting of F, Cl, N, and S. This substitution may further stabilize the crystal structure of the lithium composite oxide. The substitution of some of oxygen atoms with an anion having a larger ionic radius than the oxygen anion may widen the crystal lattice and may improve Li diffusivity. An example of the anion having a larger ionic radius than the oxygen anion is at least one anion selected from the group consisting of F, C, N, and S. As described above, the crystal structure is further stabilized in the crystal structure having the first phase and the second phase. This crystal structure may thus enable insertion and extraction of more Li. The battery thus has a high capacity.

The absence of at least one element selected from the group consisting of F, Cl, N, and S results in a large amount of oxygen redox. The crystal structure thus tends to become unstable due to oxygen release. As a result, the capacity or the cycle characteristics may be degraded.

In the first embodiment, the lithium composite oxide may contain F. At least either the first particles or the second particles contained in the lithium composite oxide may contain F.

Since the fluorine atom has high electronegativity, the substitution of some of oxygen atoms with fluorine atoms increases the interaction between cations and anions and improves the discharge capacity or operating voltage. For the same reason, electrons are localized due to dissolution of F compared with a lithium composite oxide free of F. The oxygen release is thus unlikely to occur during charging, and the crystal structure is stable. As described above, the crystal structure is further stabilized in the crystal structure having the first phase and the second phase. This crystal structure thus enables insertion and extraction of more Li. The exertion of all of these effects further improves the capacity of the battery.

WO 2014/192759 discloses a lithium composite transition metal oxide.

The lithium composite transition metal oxide disclosed in WO 2014/192759
- has both space group R-3m and space group C2/m,
- has a chemical composition represented by general formula $Li_aMO_x$ (where M is an element including at least one element selected from a Ni element, a Co element, and a Mn element), and
- has an integrated intensity ratio $I_{020}/I_{003}$ greater than or equal to 0.02 and less than or equal to 0.3.

The integrated intensity ratio $I_{020}/I_{003}$ is the ratio of the integrated intensity $I_{020}$ to the integrated intensity $I_{003}$.

The integrated intensity $I_{020}$ is the integrated intensity of the peak from the (020) plane belonging to a crystal structure of space group C2/m, and the integrated intensity $I_{003}$ is the integrated intensity of the peak from the (003) plane belonging to a crystal structure of space group R-3m.

However, techniques known in the related art, such as WO 2014/192759, neither disclose nor suggest the lithium composite oxide contained in the positive electrode active material according to the first embodiment, that is, the lithium composite oxide satisfying the following four matters (i) to (iv).

(i) The lithium composite oxide includes first particles having a crystal structure belonging to space group R-3m and second particles having a crystal structure belonging to space group C2/m.

(ii) The crystal structure of the second particles has a larger amount of cation mixing than the crystal structure of the first particles.

(iii) The second particles have a smaller particle size than the first particles.

(iv) The lithium composite oxide has an integrated intensity ratio $I_{(18°-20°)}/I_{(43°-46°)}$ greater than or equal to 0.05 and less than or equal to 0.99.

In other words, the lithium composite oxide contained in the positive electrode active material according to the first embodiment enables insertion and extraction of more Li while maintaining high Li diffusivity. In addition, the crystal structure is highly stable. Therefore, the lithium composite oxide satisfies the above four matters (i) to (iv) which could not have been easily conceived from the related art. Such a lithium composite oxide is used to provide a high-capacity battery.

The integrated intensity of an X-ray diffraction peak can be calculated by using, for example, software (e.g., software having product name PDXL included with a powder X-ray diffractometer available from Rigaku Corporation) included with an XRD system. In this case, the integrated intensity of the X-ray diffraction peak is obtained by, for example, calculating the area of the X-ray diffraction peak from the full width at half maximum and height of the X-ray diffraction peak.

In the XRD pattern obtained by using a Cu Kα ray, the maximum peak present in the range of angle of diffraction 2θ greater than or equal to 18° and less than or equal to 20° normally reflects the (001) plane in the case of the crystal structure belonging to space group C2/m. The maximum peak present in the range of angle of diffraction 2θ greater than or equal to 20° and less than or equal to 23° reflects the (020) plane. The maximum peak present in the range of angle of diffraction 2θ greater than or equal to 43° and less than or equal to 46° reflects the (114) plane.

In the XRD pattern obtained by using a Cu Kα ray, the maximum peak present in the range of angle of diffraction 2θ greater than or equal to 180 and less than or equal to 20° normally reflects the (003) plane in the case of the crystal structure belonging to space group R-3m. No diffraction peak is present in the range of angle of diffraction 2θ greater than or equal to 20° and less than or equal to 23°. The maximum peak present in the range of angle of diffraction 2θ greater than or equal to 43° and less than or equal to 46° reflects the (104) plane.

In the first embodiment, it is not always easy to completely specify the space group reflected by the maximum peak present in the range of angle of diffraction 2θ greater than or equal to 18 and less than or equal to 20° because the lithium composite oxide has the first phase having a crystal structure belonging to space group C2/m and the second phase having a crystal structure belonging to space group R3-m. For the same reason, it is not always easy to completely specify the space group reflected by the maximum peak present in the range of angle of diffraction 2θ greater than or equal to 43° and less than or equal to 46°.

For this, electron diffraction measurement using a transmission electron microscope (i.e., "TEM") may be performed in addition to the X-ray diffraction measurement described above. The space group of the lithium composite oxide can be specified by observing the electron diffraction pattern by a known technique. This technique can confirm that the lithium composite oxide has a first phase having a crystal structure belonging to space group C2/m and a second phase having a crystal structure belonging to space group R-3m.

In the first embodiment, the lithium composite oxide may be a two-phase mixture including the first phase and the second phase.

To further improve the capacity of the battery, the surfaces of the first particles may have a crystal structure belonging to a space group other than space group C2/m and space group R-3m in the first embodiment. For example, the surfaces of the first particles may have a crystal structure belonging to space group Fd-3m, space group Fm-3m, or space group I41/amd. Similarly, the surfaces of the second particles may also have a crystal structure belonging to a space group other than space group C2/m and space group R-3m. For example, the surfaces of the second particles may also have a crystal structure belonging to space group Fd-3m, space group Fm-3m, or space group I41/amd.

In the first embodiment, the lithium composite oxide contains not only a lithium atom but also an atom other than the lithium atom. Examples of the atom other than the lithium atom include Mn, Co, Ni, Fe, Cu, V, Nb, Mo, Ti, Cr, Zr, Zn, Na, K, Ca, Mg, Pt, Au, Ag, Ru, W, B, Si, P, and Al. The lithium composite oxide may contain one atom other than the lithium atom. Alternatively, the lithium composite oxide may contain two or more atoms other than the lithium atom. For example, at least either the first particles or the second particles contained in the lithium composite oxide may contain at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

To further improve the capacity of the battery, the lithium composite oxide may contain at least one 3d transition metal element selected from the group consisting of Mn, Co, Ni, Fe, Cu, V, Ti, Cr, and Zn in the first embodiment. For example, at least either the first particles or the second particles contained in the lithium composite oxide may contain at least one 3d transition metal element selected from the group consisting of Mn, Co, Ni, Fe, Cu, V, Ti, Cr, and Zn.

To further improve the capacity of the battery, the lithium composite oxide may contain at least one element selected from the group consisting of Mn, Co, Ni, and Al in the first embodiment. For example, at least either the first particles or the second particles contained in the lithium composite oxide may contain at least one element selected from the group consisting of Mn, Co, Ni, and Al.

In the first embodiment, the lithium composite oxide may contain Mn. For example, at least either the first particles or the second particles contained in the lithium composite oxide may contain Mn.

Since it is easy to form the hybrid orbitals of Mn and oxygen, oxygen release is unlikely to occur during charging. As described above, the crystal structure is further stabilized in the crystal structure having the first phase and the second phase. This crystal structure may thus enable insertion and extraction of more Li. As a result, the battery has a higher capacity.

Next, an example of the chemical composition of the lithium composite oxide will be described.

In the first embodiment, the average composition of the lithium composite oxide may be represented by the following composition formula (I).

The lithium composite oxide may have the average composition represented by the following composition formula (I).

$$Li_xMe_yO_\alpha Q_\beta \qquad \text{composition formula (I)}$$

where Me may be at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Q may be at least one selected from the group consisting of F, Cl, N, and S.

In addition, the following four equations may be satisfied in the composition formula (I):

$$1.05 \leq x \leq 1.5,$$

$$0.6 \leq y \leq 1.0,$$

$$1.2 \leq \alpha \leq 2.0, \text{ and}$$

$$0 \leq \beta \leq 0.8.$$

The above-described lithium composite oxide improves the capacity of the battery.

When Me is represented by chemical formula $Me'_{y1}Me''_{y2}$  (where Me' and Me" each independently represent the at least one selected for Me), then "y=y1+y2" is satisfied. For example, when Me is $Mn_{0.5}Co_{0.2}$, then "y=0.6+0.2=0.8" is satisfied. Even when Q includes two or more elements, the same calculation as for Me can be performed.

When x is greater than or equal to 1.05, a large amount of Li can be inserted into or extracted from the positive electrode active material. This results in a high capacity.

When x is less than or equal to 1.5, the oxidation-reduction reaction of Me increases the amount of Li inserted into or extracted from the positive electrode active material. As a result, there is no need of frequent use of the oxidation-reduction reaction of oxygen. The crystal structure is stabilized accordingly. This results in a high capacity.

When y is greater than or equal to 0.6, the oxidation-reduction reaction of Me increases the amount of Li inserted into or extracted from the positive electrode active material. As a result, there is no need of frequent use of the oxidation-reduction reaction of oxygen. The crystal structure is stabilized accordingly. This results in a high capacity.

When y is less than or equal to 1.0, a large amount of Li can be inserted into or extracted from the positive electrode active material. This results in a high capacity.

When $\alpha$ is greater than or equal to 1.2, the decrease in amount of charge compensation due to oxidation-reduction of oxygen can be prevented. This results in a high capacity.

When $\alpha$ is less than or equal to 2.0, an excessive increase in capacity due to oxidation-reduction of oxygen can be prevented, and the crystal structure is stabilized when Li is extracted. This results in a high capacity.

When $\beta$ is less than or equal to 0.8, the increase in influence of electrochemically inactive Q can be prevented, which improves electronic conductivity. This results in a high capacity.

The "average composition" of the lithium composite oxide is obtained by analyzing the elements of the lithium composite oxide without taking differences in the composition of each phase of the lithium composite oxide into consideration. The "average composition" typically refers to a composition obtained by performing elemental analysis using a sample having a size similar to or larger than that of the primary particles of the lithium composite oxide. The first phase and the second phase may have the same chemical composition. Alternatively, the first phase and the second phase may have different compositions from each other.

The average composition can be determined by inductively coupled plasma emission spectrometry, an inert gas fusion-infrared absorption method, ion chromatography, or a combination of these analytical methods.

To further increase the capacity of the battery, Me in the composition formula (I) may include at least one 3d transition metal element selected from the group consisting of Mn, Co, Ni, Fe, Cu, V, Ti, Cr, and Zn.

To further increase the capacity of the battery, Me in the composition formula (I) may include at least one metal element selected from the group consisting of Mn, Co, Ni, Mg, and Al.

In the composition formula (I), Me may include Mn. In other words, Me may be Mn.

Alternatively, Me may include not only Mn but also at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

As described above, oxygen release is unlikely to occur during charging since it is easy to form the hybrid orbitals of Mn and oxygen. The crystal structure is further stabilized in the crystal structure having the first phase and the second phase. This crystal structure may thus enable insertion and extraction of more Li. As a result, the battery has a higher capacity.

In the composition formula (I), the molar ratio of Mn to Me may be high than or equal to 60%. In other words, the molar ratio of Mn to the entire Me including Mn (i.e., the molar ratio of Mn/Me) is greater than or equal to 0.6 and less than or equal to 1.0.

As described above, oxygen release is unlikely to occur during charging since it is easy to form the hybrid orbitals of Mn and oxygen. The crystal structure is further stabilized in the crystal structure having the first phase and the second phase. This crystal structure may thus enable insertion and extraction of more Li. As a result, the battery has a higher capacity.

In the composition formula (I), Me may include at least one element selected from the group consisting of B, Si, P, and Al such that the molar ratio of the at least one element to Me is less than or equal to 20%.

Since B, Si, P, and Al have high covalency, the lithium composite oxide has a stable crystal structure. This results in better cycle characteristics and a longer battery life.

Q may include F.

In other words, Q may be F.

Alternatively, Q may include not only F but also at least one element selected from the group consisting of Cl, N, and S.

Since the fluorine atom has high electronegativity, the substitution of some of oxygen atoms with fluorine atoms increases the interaction between cations and anions and improves the discharge capacity or operating voltage. For the same reason, electrons are localized due to dissolution of F compared with a lithium composite oxide free of F. The oxygen release is thus unlikely to occur during charging, and the crystal structure is stable. As described above, the crystal structure is further stabilized in the crystal structure having the first phase and the second phase. This crystal structure thus enables insertion and extraction of more Li. The exertion of all of these effects further improves the capacity of the battery.

To further increase the capacity of the battery, the following two mathematical formulas may be satisfied:

$1.166 \leq x \leq 1.4$, and $0.67 \leq y \leq 1.0$.

To further increase the capacity of the battery, the following two mathematical formulas may be satisfied:

$1.33 \leq \alpha < 2.0$, and $0 \leq \beta \leq 0.67$.

In the case where the above two mathematical formulas are satisfied, the crystal structure is maintained stable because of the influence of electrochemically inactive Q even when Li is extracted. As a result, the battery has a higher capacity.

The following two mathematical formulas may be satisfied:

$1.33 \leq \alpha \leq 1.9$, and $0.1 \leq \beta \leq 0.67$.

When the above two mathematical formulas are satisfied, an excessive increase in capacity due to oxidation-reduction of oxygen can be prevented. As a result, the influence of electrochemically inactive Q is exhibited sufficiently, so that the crystal structure is maintained stable even when Li is extracted. The battery thus has a high capacity The molar ratio of Li to Me is represented by formula (x/y).

To further improve the capacity of the battery, the molar ratio (x/y) may be greater than or equal to 1.4 and less than or equal to 2.0.

When the molar ratio (x/y) is greater than 1, the ratio of the number of Li atoms in the lithium composite oxide contained in the positive electrode active material according to the first embodiment is greater than the ratio of the number of Li atoms in a conventional positive electrode active material represented by, for example, composition formula $LiMnO_2$. The crystal structure thus enables insertion and extraction of more Li.

When the molar ratio (x/y) is greater than or equal to 1.4, a large amount of Li is available, and the Li diffusion paths are formed appropriately. Therefore, the battery has a higher capacity when the molar ratio (x/y) is greater than or equal to 1.4.

When the molar ratio (x/y) is less than or equal to 2.0, the decrease in occurrence of the oxidation-reduction reaction of available Me can be prevented. As a result, there is no need of frequent use of the oxidation-reduction reaction of oxygen. This prevents a decrease in Li insertion efficiency during discharging caused as a result of destabilization of the crystal structure when Li is extracted during charging. The battery thus has a higher capacity.

To further improve the capacity of the battery, the molar ratio (x/y) may be greater than or equal to 1.5 and less than or equal to 2.0.

The molar ratio of O to Q is represented by formula ($\alpha/\beta$).

To further improve the capacity of the battery, the molar ratio ($\alpha/\beta$) may be greater than or equal to 2 and less than or equal to 19.

When the molar ratio ($\alpha/\beta$) is greater than or equal to 2, the decrease in amount of charge compensation due to oxidation-reduction of oxygen can be prevented. In addition, the influence of electrochemically inactive Q can be reduced, so that the electronic conductivity is improved accordingly. The battery thus has a higher capacity.

When the molar ratio ($\alpha/\beta$) is less than or equal to 19, an excessive increase in capacity due to oxidation-reduction of oxygen can be prevented. The crystal structure is stabilized accordingly when Li is extracted. In addition, the influence of electrochemically inactive Q is exhibited sufficiently, so that the crystal structure is maintained stable when Li is extracted. Therefore, a higher-capacity battery can be obtained.

As described above, the lithium composite oxide may have an average composition represented by composition formula $Li_xMe_yO_\alpha Q_\beta$. The lithium composite oxide thus includes a cation portion and an anion portion. The cation portion includes Li and Me. The anion portion includes O and Q. The molar ratio of the cation portion including Li and Me to the anion portion including O and Q is represented by formula $((x+y)/(\alpha+\beta))$.

To further improve the capacity of the battery, the molar ratio $((x+y)/(\alpha+\beta))$ may be greater than or equal to 0.75 and less than or equal to 1.2

When the molar ratio $((x+y)/(\alpha+\beta))$ is greater than or equal to 0.75, the formation of large amounts of impurities can be prevented during synthesis of the lithium composite oxide, and the battery has a higher capacity.

When the molar ratio $((x+y)/(\alpha+\beta))$ is less than or equal to 1.2, the amount of loss of the anion portion in the lithium composite oxide is small, and the crystal structure is maintained stable even after lithium is extracted from the lithium composite oxide during charging.

To further improve the capacity of the battery, the molar ratio $((x+y)/(\alpha+\beta))$ may be greater than or equal to 1.0 and less than or equal to 1.2.

In the lithium composite oxide, some of Li atoms may be substituted with an alkali metal, such as Na or K.

The positive electrode active material in the first embodiment may contain the above-described lithium composite oxide as a main component. In other words, the positive electrode active material in the first embodiment may contain the above-described lithium composite oxide such that the mass ratio of the lithium composite oxide to the entire positive electrode active material is greater than or equal to 50%. Such a positive electrode active material further improves the capacity of the battery.

To further improve the capacity of the battery, the mass ratio may be greater than or equal to 70%.

To further improve the capacity of the battery, the mass ratio may be greater than or equal to 90%.

The positive electrode active material in the first embodiment may contain inevitable impurities in addition to the above-described lithium composite oxide.

The positive electrode active material in the first embodiment may contain starting materials of the positive electrode active material as unreacted materials. The positive electrode active material in the first embodiment may contain by-products generated during synthesis of the lithium composite oxide. The positive electrode active material in the first embodiment may contain degradation products generated as a result of degradation of the lithium composite oxide.

The positive electrode active material in the first embodiment may contain only the above-described lithium composite oxide except for inevitable impurities.

The positive electrode active material containing only the lithium composite oxide further improves the capacity of the battery.

Method for Producing Lithium Composite Oxide

An example method for manufacturing the lithium composite oxide contained in the positive electrode active material according to the first embodiment will be described below.

The lithium composite oxide is produced by, for example, the following method.

A Li-containing raw material, a Me-containing raw material, and a Q-containing raw material are provided.

Examples of the Li-containing raw material include lithium oxides, such as $Li_2O$ and $Li_2O_2$, lithium salts, such as LiF, $Li_2CO_3$, and LiOH, and lithium composite oxides, such as $LiMeO_2$ and $LiMe_2O_4$.

Examples of the Me-containing raw material include metal oxides, such as $Me_2O_3$, metal salts, such as $MeCO_3$ and $Me(NO_3)_2$, metal hydroxides, such as $Me(OH)_2$ and MeOOH, and lithium composite oxides, such as $LiMeO_2$ and $LiMe_2O_4$.

When Me is, for example, Mn, examples of the Mn-containing raw material include manganese oxides, such as $MnO_2$ and $Mn_2O_3$, manganese salts, such as $MnCO_3$ and $Mn(NO_3)_2$, manganese hydroxides, such as $Mn(OH)_2$ and MnOOH, and lithium-manganese composite oxides, such as $LiMnO_2$ and $LiMn_2O_4$.

Examples of the Q-containing raw material include lithium halides, transition metal halides, transition metal sulfides, and transition metal nitrides.

When Q is F, examples of the F-containing raw material include LiF and transition metal fluorides.

The weights of these raw materials are measured such that, for example, the molar ratio of Li ions to transition metal cations is greater than or equal to 0.8 and less than or equal to 1.5. The raw materials are mixed by, for example, a dry method or wet method, and then caused to mechanochemically react with each other in a mixing device, such as a planetary ball mill, for 30 hours or longer to form a first precursor. The first precursor may be a precursor of the first particles. Separately, a second precursor is prepared. Similarly, the raw materials are mixed by, for example, a dry method or wet method, and then caused to mechanochemically react with each other in a mixing device, such as a planetary ball mill, for 30 hours or longer to form a second precursor. The second precursor may be a precursor of the second particles. The first precursor and the second precursor differ from each other in, for example, the mixing ratio of the raw materials or the conditions of the mechanochemical reaction. Examples of the conditions of the mechanochemical reaction include the rotational speed of the planetary ball mill or the reaction time. The mechanochemical reaction for forming the first precursor and the mechanochemical reaction for forming the second precursor may be referred to as a "first-step mechanochemical reaction" and a "second-step mechanochemical reaction", respectively The present inventors have found that the particle size tends to decrease as the rotational speed of the planetary ball mill increases during the mechanochemical reaction. The particle size can be reduced by mixing the precursor with, for example, a carbon material, such as acetylene black, again after the mechanochemical reaction and next pulverizing the mixture.

Furthermore, the first precursor and the second precursor are prepared at a predetermined composition ratio and mixed. The final precursor is prepared accordingly. The final precursor is heat-treated. The conditions of the heat treatment is appropriately set so as to provide a desired lithium composite oxide.

Although the optimum conditions of the heat treatment depend on other manufacture conditions and an intended composition, the present inventors have found that the integrated intensity ratio $I_{(18°-20°)}/I_{(43°-46°)}$ tends to decrease as the amount of Li contained in the first precursor decreases or as the temperature of the heat treatment decreases. The manufacture can determine the conditions of the heat treatment using this tendency as a reference. The temperature and time of the heat treatment may be selected from, for example, the range of 200 to 900° C., and the range of 1 minute to 20 hours, respectively. The atmosphere of the heat treatment is, for example, the atmosphere, an oxygen atmosphere, or an inert atmosphere (e.g., a nitrogen atmosphere or an argon atmosphere).

As described above, a desired lithium composite oxide can be obtained by controlling raw materials, the mixing conditions of the raw materials, and the conditions of the heat treatment.

As described above, the values of x, y, α and β can be varied in the ranges described in the composition formula (I).

The space group of the crystal structure of the obtained lithium composite oxide can be specified by, for example, X-ray diffraction measurement or electron diffraction measurement. Such measurement can determine that each particle of the obtained lithium composite oxide has, for example, a crystal structure belonging to space group C2/m or a crystal structure belonging to space group R-3m.

Each first particle may contain a crystal structure belonging to a space group other than space group R-3m. Similarly, each second particle may contain a crystal structure belonging to a space group other than space group C2/m.

The average composition of the obtained lithium composite oxide may be determined by, for example, ICP emission spectrometry, an inert gas fusion-infrared absorption method, ion chromatography, or a combination of these analytical methods.

The energy of element mixing can be lowered by using a lithium transition metal composite oxide as a raw material. This can improve the purity of the lithium composite oxide.

As described above, the method for manufacturing the lithium composite oxide in the first embodiment includes a step (a) of providing raw materials, a step (b) of causing the raw materials to mechanochemically react with each other to form precursors for the lithium composite oxide, and a step (c) of heat-treating the precursors to form the lithium composite oxide.

The raw materials may be a raw material mixture, and the ratio of Li to Me in the raw material mixture may be greater than or equal to 1.4 and less than or equal to 2.0.

A lithium compound used as a raw material may be produced by a known method.

The raw materials may be a raw material mixture, and the ratio of Li to Me in the raw material mixture may be greater than or equal to 1.5 and less than or equal to 2.0.

In the step (b), the mechanochemical reaction of the raw materials using a ball mill may be repeated two times.

To produce the lithium composite oxide in the first embodiment, as described above, raw materials (e.g., LiF, $Li_2O$, a transition metal oxide, or a lithium composite transition metal) may be mixed to cause the mechanochemical reaction by using a planetary ball mill to form a precursor, and the formed precursor may next be heat-treated.

Second Embodiment

A second embodiment will be described below. The matters described in the first embodiment may be appropriately omitted.

The battery according to the second embodiment includes a positive electrode containing the positive electrode active material according to the first embodiment, a negative electrode, and an electrolyte.

The battery according to the second embodiment has a high capacity.

The positive electrode in the battery according to the second embodiment may include a positive electrode active material layer. The positive electrode active material layer may contain the positive electrode active material according to the first embodiment as a main component. In other words, the mass ratio of the positive electrode active material to the entire positive electrode active material layer is greater than or equal to 50%.

Such a positive electrode active material layer further improves the capacity of the battery.

The mass ratio may be greater than or equal to 70%.

Such a positive electrode active material layer further improves the capacity of the battery.

The mass ratio may be greater than or equal to 90%.

Such a positive electrode active material layer further improves the capacity of the battery.

The battery according the second embodiment is, for example, a lithium-ion secondary battery, a non-aqueous electrolyte secondary battery, or an all-solid battery.

In the battery according to the second embodiment, the negative electrode may contain a negative electrode active material capable of intercalating and deintercalating lithium ions. Alternatively, the negative electrode may contain a material from which lithium metal dissolves into the electrolyte during discharging and on which the lithium metal deposits during charging.

In the battery according to the second embodiment, the electrolyte may be a non-aqueous electrolyte (e.g., non-aqueous electrolyte solution).

In the battery according to the second embodiment, the electrolyte may be a solid electrolyte.

FIG. 1 is a cross-sectional view of a battery 10 in the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (e.g., non-aqueous electrolyte solution).

The positive electrode 21, the negative electrode 22, and the separator 14 form an electrode group.

The electrode group is accommodated in the case 11.

The case 11 is closed with the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., at least one selected from the group consisting of aluminum, stainless steel, nickel, iron, titanium, copper, palladium, gold, and platinum) or an alloy thereof.

The positive electrode current collector 12 may not be provided. In this case, the case 11 is used as a positive electrode current collector.

The positive electrode active material layer 13 contains the positive electrode active material according to the first embodiment.

The positive electrode active material layer 13 may contain an additive (a conductive agent, an ionic conduction aid, or a binder) as desired.

The negative electrode 22 includes a negative electrode current collector 16 and a negative electrode active material layer 17 disposed on the negative electrode current collector 16.

The negative electrode current collector 16 is made of, for example, a metal material (e.g., at least one selected from the group consisting of aluminum, stainless steel, nickel, iron, titanium, copper, palladium, gold, and platinum) or an alloy thereof.

The negative electrode current collector 16 may not be provided. In this case, the sealing plate 15 is used as a negative electrode current collector.

The negative electrode active material layer 17 contains a negative electrode active material.

The negative electrode active material layer 17 may contain an additive (a conductive agent, an ionic conduction aid, or a binder) as desired.

Examples of the material of the negative electrode active material include metal materials, carbon materials, oxides, nitrides, tin compounds, and silicon compounds.

The metal material may be a single metal. Alternatively, the metal material may be an alloy. Examples of the metal materials include lithium metal and lithium alloys.

Examples of the carbon materials include natural graphite, coke, partially graphitized carbon, carbon fiber, spherical carbon, artificial graphite, and amorphous carbon.

In view of capacity density, the negative electrode active material can be silicon (i.e., Si), tin (i.e., Sn), a silicon compound, or a tin compound. The silicon compound and the tin compound may be an alloy or a solid solution.

Examples of the silicon compounds include $SiO_x$ (where $0.05<x<1.95$).

A compound formed by substituting some of silicon atoms of $SiO_x$ with other element can also be used. The compound is an alloy or a solid solution. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compounds include $Ni_2Sn_4$, $Mg_2Sn$, $SnO_x$ (where $0<x<2$), $SnO_2$, and $SnSiO_3$. One tin compound selected from these compounds may be used alone. Alternatively, two or more tin compounds selected from these compounds may be used in combination.

The shape of the negative electrode active material is not limited. The negative electrode active material may be a negative electrode active material having a known shape (e.g., particle shape or fibrous shape).

The method for charging (i.e., intercalating) lithium into the negative electrode active material layer 17 is not limited. Specific examples of the method include a method (a) of depositing lithium on the negative electrode active material layer 17 by a gas phase method, such as a vacuum deposition method, and a method (b) of bringing lithium metal foil and the negative electrode active material layer 17 into contact with each other and heating the lithium metal foil and the negative electrode active material layer 17. In either method, lithium is thermally diffused into the negative electrode active material layer 17. A method of electrochemically intercalating lithium into the negative electrode active material layer 17 may also be used. Specifically, a battery is assembled by using the negative electrode 22 free of lithium and lithium metal foil (negative electrode). Subsequently, the battery is charged such that lithium is intercalated into the negative electrode 22.

Examples of the binder for the positive electrode 21 and the negative electrode 22 include polyvinylidene fluoride, polytetrafluoroethylene, polyethylene, polypropylene, aramid resin, polyamide, polyimide, polyamideimide, polyacrylonitrile, poly(acrylic acid), poly(methyl acrylate), poly (ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose.

Other examples of the binder include copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may be a mixture of two or more binders selected from these materials.

Examples of the conductive agent for the positive electrode 21 and the negative electrode 22 include graphite, carbon black, conductive fibers, graphite fluoride, metal powders, conductive whiskers, conductive metal oxides, and conductive organic materials.

Examples of the graphite include natural graphite and artificial graphite.

Examples of the carbon black include acetylene black, Ketjenblack, channel black, furnace black, lamp black, and thermal black.

Examples of the metal powders include aluminum powder.

Examples of the conductive whiskers include zinc oxide whiskers and potassium titanate whiskers.

Examples of the conductive metal oxides include titanium oxide.

Examples of the conductive organic materials include phenylene derivatives.

At least part of the surface of the binder may be coated with a conductive agent. For example, the surface of the binder may be coated with carbon black.

This can improve the capacity of the battery.

The separator 14 is made of a material having high ion permeability and sufficient mechanical strength. Examples of the material of the separator 14 include microporous thin films, woven fabrics, and nonwoven fabrics. Specifically, the separator 14 is preferably made of a polyolefin, such as polypropylene or polyethylene. The separator 14 made of a polyolefin not only has high durability but also exerts a shutdown function when heated excessively. The separator 14 has a thickness, for example, in the range of 10 to 300 μm (or 10 to 40 μm) The separator 14 may be a monolayer film containing one material. Alternatively, the separator 14 may be a composite film (or a multilayer film) containing two or more materials. The separator 14 has a porosity, for example, in the range of 30% to 70% (or 35% to 60%). The term "porosity" refers to the proportion of the volume of pores relative to the total volume of the separator 14. The porosity is measured by, for example, a mercury intrusion method.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvents include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

One non-aqueous solvent selected from these solvents may be used alone. Alternatively, two or more non-aqueous solvents selected from these solvents may be used in combination.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

The presence of the at least one fluorinated solvent in the non-aqueous electrolyte solution improves the oxidation resistance of the non-aqueous electrolyte solution.

As a result, the battery 10 can operate stably even when the battery 10 is charged at a high voltage.

In the battery according to the second embodiment, the electrolyte may be a solid electrolyte.

Examples of the solid electrolyte include organic polymer solid electrolytes, oxide solid electrolytes, and sulfide solid electrolytes.

Examples of the organic polymer solid electrolytes include compounds composed of a polymer compound and a lithium salt. Examples of such compounds include lithium polystyrene sulfonate.

The polymer compound may have an ethylene oxide structure. The ethylene oxide structure of the polymer compound allows the organic polymer solid electrolyte to have a high lithium salt content. As a result, the ionic conductivity can be improved.

Examples of the oxide solid electrolytes include
(i) NASICON solid electrolytes, such as $LiTi_2(PO_4)_3$ and its substituted products,
(ii) perovskite solid electrolytes, such as $(LaLi)TiO_3$.
(iii) LISICON solid electrolytes, such as $Li_{14}ZnGe_4O_{16}$, $Li_4SiO_4$, $LiGeO_4$, and their substituted products,
(iv) garnet solid electrolytes, such as $Li_7La_3Zr_2O_{12}$ and its substituted products,
(v) $Li_3N$ and its H-substituted products, and
(vi) $Li_3PO_4$ and its N-substituted products.

Examples of the sulfide solid electrolytes include $Li_2S$—$P_2S$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (X is F, Cl, Br, or I), $MO_y$, or $Li_xMO_y$ (M is P, Si, Ge, B, Al, Ga, or In, and x and y each independently represent a natural number) may be added to the sulfide solid electrolytes.

Among these electrolytes, the sulfide solid electrolytes have high formability and high ionic conductivity. The use of such a sulfide solid electrolyte as a solid electrolyte can thus further improve the energy density of the battery.

Among the sulfide solid electrolytes, $Li_2S$—$P_2S_5$ has high electrochemical stability and high ionic conductivity. The use of $Li_2S$—$P_2S_5$ as a solid electrolyte can thus further improve the energy density of the battery.

A solid electrolyte layer containing the solid electrolyte may further contain the non-aqueous electrolyte solution described above.

Since the solid electrolyte layer contains the non-aqueous electrolyte solution, lithium ions easily move between the active material and the solid electrolyte. As a result, the battery has a higher energy density.

The solid electrolyte layer may contain a gel electrolyte or an ionic liquid.

An example of the gel electrolyte is a polymer material impregnated with a non-aqueous electrolyte solution. Examples of the polymer material include polyethylene oxide, polyacrylonitrile, polyvinylidene fluoride, and polymethyl methacrylate. Other examples of the polymer material include polymers having an ethylene oxide bond.

Examples of the cation contained in the ionic liquid include
(i) chain aliphatic quaternary ammonium salt cations, such as tetraalkylammonium,
(ii) chain aliphatic quaternary phosphonium salt cations, such as tetraalkylphosphonium,
(iii) alicyclic ammoniums, such as pyrrolidinium, morpholinium, imidazolinium, tetrahydropyrimidinium, piperazinium, and piperidinium, and
(iv) nitrogen-containing heterocyclic aromatic cations, such as pyridinium and imidazolium.

Examples of the cation forming the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these lithium salts may be used alone. Alternatively, two or more lithium salts selected from these lithium salts may be used as a mixture. The concentration of the lithium salt is, for example, in the range from 0.5 to 2 mol/liter.

With regard to the shape of the battery according to the second embodiment, the battery is a coin battery, a cylindrical battery, a prismatic battery, a sheet battery, a button battery (i.e., button cell), a flat battery, or a stack battery.

EXAMPLES

Example 1

Production of Positive Electrode Active Material

A mixture of LiF, $LiMnO_2$, $LiCoO_2$, and $LiNiO_2$ was prepared so as to have a Li/Mn/Co/Ni/O/F molar ratio of 1.0/0.33/0.33/0.33/1.9/0.1.

The mixture was placed in a container having a volume of 45 milliliters together with an appropriate amount of zirconia balls each having a diameter of 3 mm, and the container was sealed in an argon glove box. The container was made of zirconia.

Next, the container was taken out of the argon glove box. The mixture contained in the container was subjected to a first-step mechanochemical reaction in an argon atmosphere in a planetary ball mill at 600 rpm for 30 hours to produce a first precursor.

The first precursor was subjected to powder X-ray diffraction measurement. As a result of powder X-ray diffraction measurement, the space group of the first precursor was determined to be Fm-3m.

Separately, a mixture of LiF, $Li_2O$, $LiMnO_2$, and $MnO_2$ was prepared so as to have a Li/Mn/O/F molar ratio of 2.0/1.0/2.8/0.2.

The mixture was placed in a container having a volume of 45 milliliters together with an appropriate amount of zirconia balls each having a diameter of 3 mm, and the container was sealed in an argon glove box. The container was made of zirconia.

Next, the container was taken out of the argon glove box. The mixture contained in the container was subjected to a second-step mechanochemical reaction in an argon atmosphere in a planetary ball mill at 800 rpm for 5 hours to produce a second precursor.

The second precursor was subjected to powder X-ray diffraction measurement. As a result of powder X-ray diffraction measurement, the space group of the second precursor was determined to be Fm-3m.

A mixture of the first precursor and the second precursor was prepared so as to have a Li/Mn/Co/Ni/O/F molar ratio of 1.2/0.54/0.13/0.13/1.9/0.1.

The mixture was placed in a container having a volume of 45 milliliters together with an appropriate amount of zirconia balls each having a diameter of 3 mm, and the container was sealed in an argon glove box. The container was made of zirconia.

Next, the container was taken out of the argon glove box. The mixture contained in the container was processed in an argon atmosphere in a planetary ball mill at 300 rpm for 5 hours to produce a final precursor.

The final precursor was heat-treated in the atmosphere at 700 degrees Celsius for one hour. A positive electrode active material according to Example 1 was prepared accordingly.

The positive electrode active material according to Example 1 was subjected to powder X-ray diffraction measurement.

Figure 2:
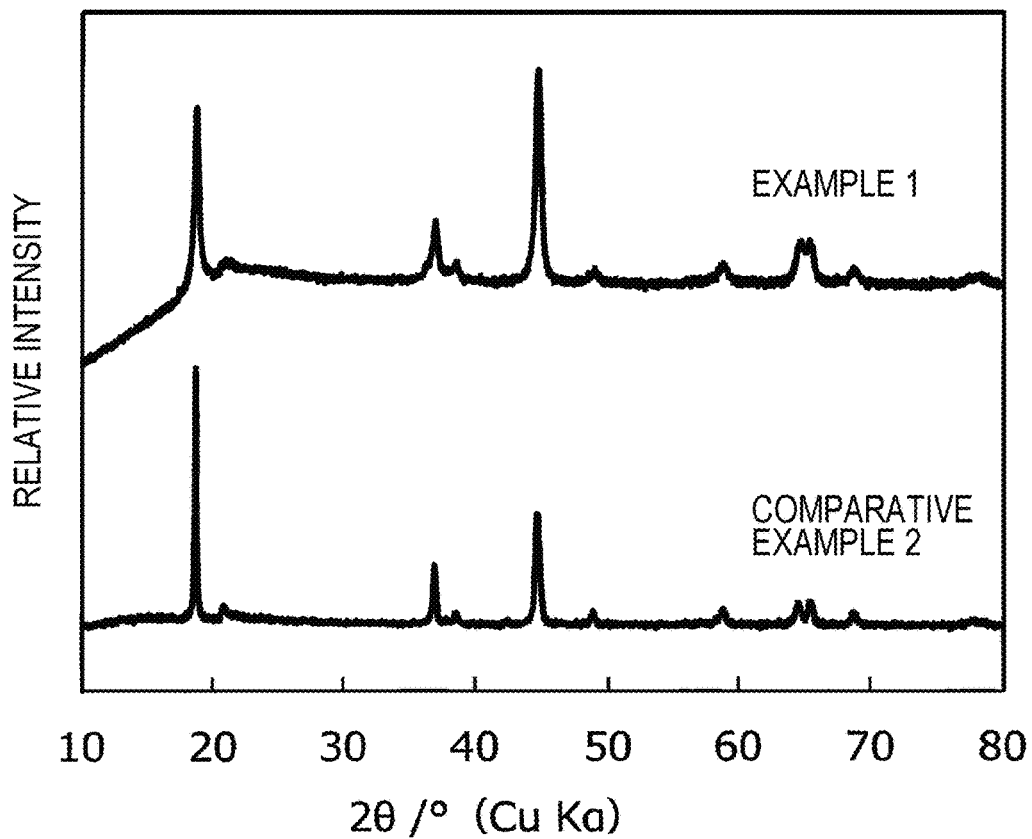
FIG. 2 is a graph showing powder X-ray diffraction patterns of positive electrode active materials of Example 1 and Comparative Example 2.

FIG. 2 illustrates the results of powder X-ray diffraction measurement.

The positive electrode active material according to Example 1 was also subjected to electron diffraction measurement. The crystal structure of the positive electrode active material according to Example 1 was analyzed on the basis of the results of powder X-ray diffraction measurement and electron diffraction measurement.

As a result, the positive electrode active material according to Example 1 was determined to be a two-phase mixture containing the first particles belonging to space group R-3m and the second particles having a crystal structure belonging to space group C2/m.

The particle size of each of the first particles and the second particles was observed by using a SEM. As a result, the second particles having a crystal structure belonging to space group C2/m had a smaller particle size than the first particles having a crystal structure belonging to space group R-3m.

The amount of cation mixing in the first particles and the second particles was calculated on the basis of atomic resolution observation with the TEM. As a result, the second particles (i.e., small size particles) having a crystal structure belonging to space group C2/m had a larger amount of cation mixing than the first particles (i.e., large size particles) having a crystal structure belonging to space group R-3m.

Figure 3A:
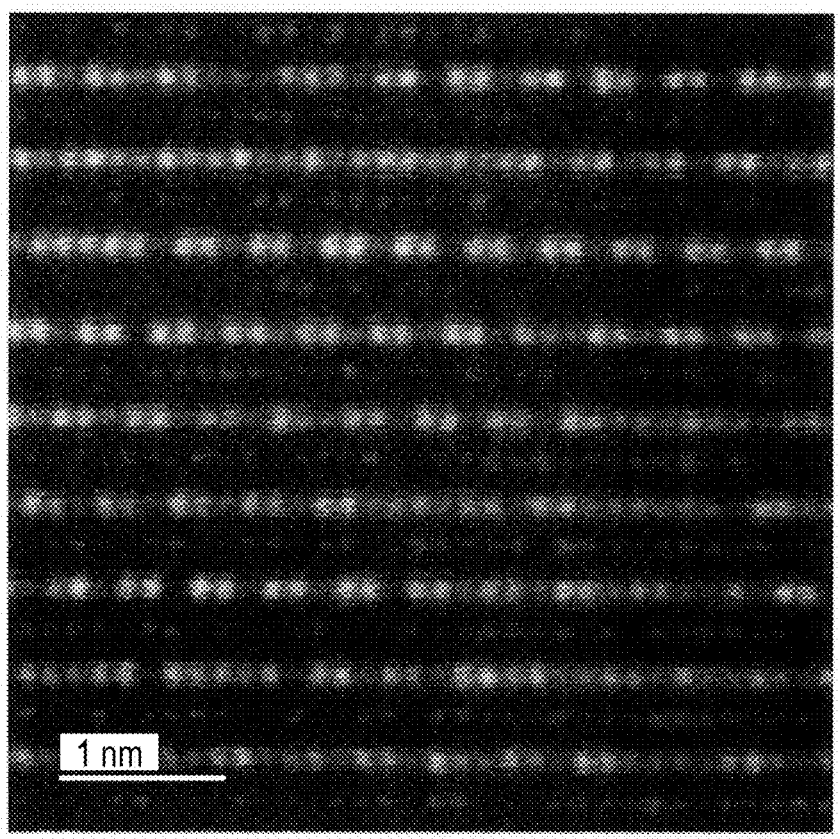
FIG. 3A is a transmission electron microscope image showing the result of atomic resolution observation of small size particles contained in the positive electrode active material of Example 1.
Figure 3B:
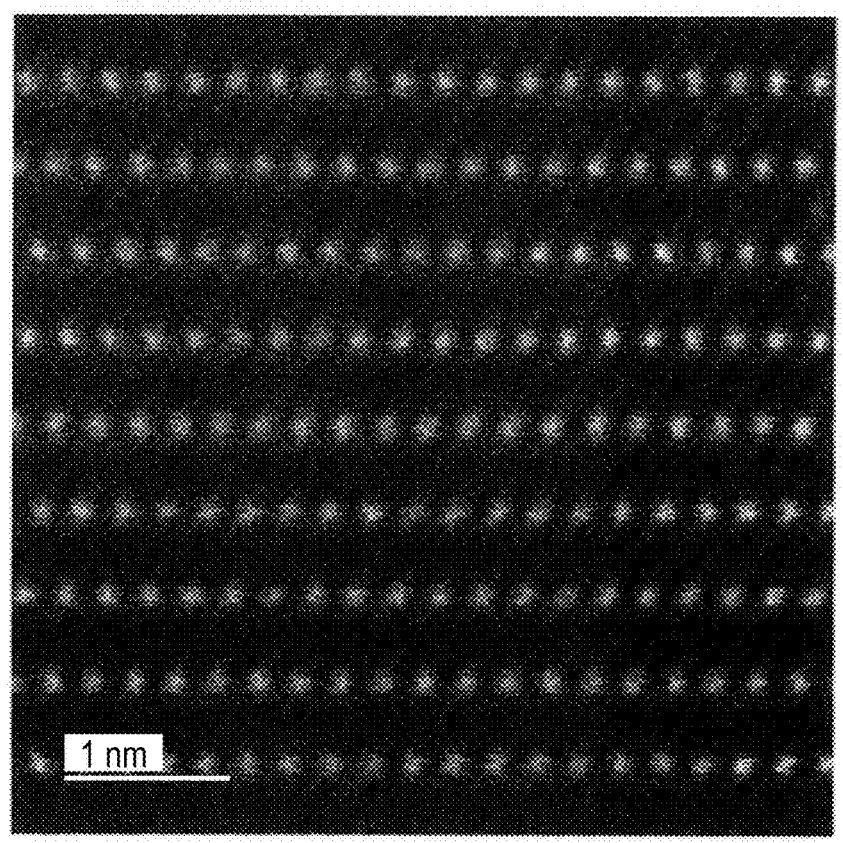
FIG. 3B is a transmission electron microscope image showing the result of atomic resolution observation of large size particles contained in the positive electrode active material of Example 1.

FIG. 3A is a transmission electron microscope image showing the result of atomic resolution observation of the second particles (i.e., small size particle). In FIG. 3A, the second particles were observed in the [1-10] direction FIG. 3B is a transmission electron microscope image showing the result of atomic resolution observation of the first particles (i.e., large size particle). In FIG. 3B, the first particles were observed in the [100] direction.

These results reveal the following matters (i) to (iii).

(i) The lithium composite oxide contained in the positive electrode active material of Example 1 contains the first particles having a crystal structure belonging to space group R-3m and the second particles having a crystal structure belonging to space group C2/m.

(ii) The crystal structure of the second particles has a larger amount of cation mixing than the crystal structure of the first particles.

(iii) Each second particle has a smaller particle size than each first particle.

From the result of powder X-ray diffraction measurement obtained by using an X-ray diffractometer (available from Rigaku Corporation), the integrated intensity of X-ray diffraction peaks was calculated by using software (product name: PDXL) included with the X-ray diffractometer. The positive electrode active material according to Example 1 had an integrated intensity ratio $I_{(18°-20°)}/I_{(43°-46°)}$ of 0.97.

Production of Battery

Next, 70 parts by mass of the positive electrode active material according to Example 1, 20 parts by mass of acetylene black, 10 parts by mass of polyvinylidene fluoride (hereinafter "PVDF"), and an appropriate amount of N-methyl-2-pyrrolidone (hereinafter "NMP") were mixed. A positive electrode mixture slurry was prepared accordingly. Acetylene black functioned as a conductive agent. Polyvinylidene fluoride functioned as a binder.

The positive electrode mixture slurry was applied to one surface of a positive electrode current collector formed of aluminum foil having a thickness of 20 micrometers.

The positive electrode mixture slurry was dried and rolled to provide a positive electrode plate including a positive electrode active material layer and having a thickness of 60 micrometers.

The obtained positive electrode plate was punched out to provide a circular positive electrode having a diameter of 12.5 mm.

Lithium metal foil having a thickness of 300 micrometers was punched out to provide a circular negative electrode having a diameter of 14 mm. Separately, fluoroethylene carbonate (hereinafter "FEC"), ethylene carbonate (hereinafter "EC"), and ethyl methyl carbonate (hereinafter "EMC") were mixed at a volume ratio of 1:1:6 to provide a non-aqueous solvent.

In the non-aqueous solvent, $LiPF_6$ was dissolved at a concentration of 1.0 mol/liter to provide a non-aqueous electrolyte solution.

A separator was soaked with the obtained non-aqueous electrolyte solution. The separator was a product (Celgard 2320, 25 micrometers thick) available from Celgard, LLC. The separator was a three-layer separator including a polypropylene layer, a polyethylene layer, and a polypropylene layer.

By using the positive electrode, the negative electrode, and the separator described above, a coin battery having a diameter of 20 mm and a thickness of 3.2 mm was produced in a dry box in which the dew point was maintained at −50 degrees Celsius.

Examples 2 to 7

In Example 2 to Example 7, positive electrode active materials were prepared in the same manner as in Example except for the following matters (i) and (ii).

(i) At least one of the mixing ratios (i.e., Li/Me/O/F mixing ratios) of the mixtures for the first precursor, the second precursor, and the final precursor was changed.

(ii) The heating conditions were changed in the range of 500 to 900° C., and 10 minutes to 5 hours.

Table 1 shows the average compositions of the positive electrode active materials according to Examples 2 to 7.

Like the positive electrode active material according to Example 1, the positive electrode active materials according to Examples 2 to 7 were determined to be a two-phase mixture containing the first particles having a crystal structure belonging to space group R-3m and the second particles having a crystal structure belonging to space group C2/m.

By using the positive electrode active materials according to Examples 2 to 7, coin batteries according to Examples 2 to 7 were produced in the same manner as that for the positive electrode active material according to Example 1.

Comparative Example 1

In Comparative Example 1, a positive electrode active material having a composition represented by chemical formula $LiCoO_2$ (i.e., lithium cobalt oxide) was prepared by using a known technique.

The obtained positive electrode active material was subjected to powder X-ray diffraction measurement.

From the result of powder X-ray diffraction measurement, the space group of the positive electrode active material according to Comparative Example 1 was determined to space group R-3m.

The integrated intensity ratio $I_{(18°-20°)}/I_{(43°-46°)}$ of the positive electrode active material according to Comparative Example 1 was 1.23.

By using the positive electrode active material according to Comparative Example 1, a coin battery according to Comparative Example 1 was produced in the same manner as in Example 1.

Comparative Example 2

In Comparative Example 2, a positive electrode active material was produced in the same manner as in Example 1 except for the following matter (i)

(i) The final precursor was heat-treated at 700° C. for 12 hours.

The positive electrode active material according to Comparative Example 2 was subjected to powder X-ray diffraction measurement.

The result of the measurement is shown in FIG. 2.

By using the positive electrode active material according to Comparative Example 2, a coin battery according to Comparative Example 2 was produced in the same manner as in Example 1.

Evaluation of Batteries

The battery of Example 1 was charged at a current density of 0.1 $mA/cm^2$ until a voltage of 4.7 V was reached.

Subsequently, the battery of Example 1 was discharged at a current density of 0.1 $mA/cm^2$ until a voltage of 2.5 V was reached.

The initial discharge capacity of the battery of Example was 1.76 $mAh/cm^2$.

The battery of Comparative Example 1 was charged at a current density of 0.1 $mA/cm^2$ until a voltage of 4.3 V was reached.

Subsequently, the battery of Comparative Example 1 was discharge data current density of 0.1 $mA/cm^2$ until a voltage of 2.5 was reached.

The initial discharge capacity of the battery of Comparative Example 1 was 0.95 $mAh/cm^2$.

The initial discharge capacities of the coin batteries of Example 2 to Example 7 and Comparative Example 2 were measured similarly.

Table 1 below shows the results of Example 1 to Example 7 and Comparative Example 1 to Comparative Example 2.

TABLE 1

|  | Average Composition | Space Group | Mixing of First Particles and Second Particles | $I_{(18°-20°)}/I_{(43°-46°)}$ | Initial Discharge Capacity ($mA/cm^2$) |
|---|---|---|---|---|---|
| Example 1 | $Li_{1.2}Mn_{0.54}Co_{0.13}Ni_{0.13}O_{1.9}F_{0.1}$ | C2/m R-3 m | mixed | 0.95 | 1.76 |
| Example 2 | $Li_{1.2}Mn_{0.54}Co_{0.13}Ni_{0.13}O_{1.9}F_{0.1}$ | C2/m R-3 m | mixed | 0.99 | 1.74 |

TABLE 1-continued

| | Average Composition | Space Group | Mixing of First Particles and Second Particles | $I_{(18°\text{-}20°)}/I_{(43°\text{-}46°)}$ | Initial Discharge Capacity (mA/cm$^2$) |
|---|---|---|---|---|---|
| Example 3 | Li$_{1.2}$Mn$_{0.54}$Co$_{0.13}$Ni$_{0.13}$O$_{1.9}$F$_{0.1}$ | C2/m R-3 m | mixed | 0.75 | 1.73 |
| Example 4 | Li$_{1.166}$Mn$_{0.5}$Co$_{0.167}$Ni$_{0.167}$O$_{1.9}$F$_{0.1}$ | C2/m R-3 m | mixed | 0.95 | 1.75 |
| Example 5 | Li$_{1.2}$Mn$_{0.504}$Co$_{0.136}$Ni$_{0.16}$O$_{1.9}$F$_{0.1}$ | C2/m R-3 m | mixed | 0.62 | 1.68 |
| Example 6 | Li$_{1.2}$Mn$_{0.54}$Co$_{0.11}$Ni$_{0.11}$Al$_{0.04}$O$_{1.9}$F$_{0.1}$ | C2/m R-3 m | mixed | 0.88 | 1.71 |
| Example 7 | Li$_{1.2}$Mn$_{0.54}$Co$_{0.11}$Ni$_{0.11}$Mg$_{0.04}$O$_{1.9}$F$_{0.1}$ | C2/m R-3 m | mixed | 0.89 | 1.65 |
| Comparative Example 1 | LiCoO$_2$ | R-3 m | not mixed | 1.23 | 0.95 |
| Comparative Example 2 | Li$_{1.2}$Mn$_{0.54}$Co$_{0.13}$Ni$_{0.13}$O$_{1.9}$F$_{0.1}$ | C2/m R-3 m | mixed | 1.18 | 1.56 |

As shown in Table 1, the batteries of Examples 1 to 7 have an initial discharge capacity of 1.65 to 1.76 mAh/cm$^2$.

In other words, the initial discharge capacities of the batteries of Examples 1 to 7 are greater than the initial discharge capacities of the batteries of Comparative Examples 1 and 2.

The reasons for this may be because the following matters (i) to (iii) are satisfied.

(i) The lithium composite oxides contained in the positive electrode active materials of Examples 1 to 7 contain the first particles having a crystal structure belonging to space group R-3m and the second particles having a crystal structure belonging to space group C2/m.

(ii) The crystal structure of the second particles has a larger amount of cation mixing than the crystal structure of the first particles.

(iii) The integrated intensity ratio $I_{(18°\text{-}20°)}/I_{(43°\text{-}46°)}$ is greater than or equal to 0.05 and less than or equal to 0.99.

In Comparative Example 1, the integrated intensity ratio $I_{(18°\text{-}20°)}/I_{(43°\text{-}46°)}$ is greater than 0.99, and the crystal structure is a single phase of space group R-3m. This may reduce insertion and extraction of Li during charging and discharging and may lower the stability of the crystal structure. This may result in a significant decrease in initial discharge capacity.

In Comparative Example 2, the integrated intensity ratio $I_{(18°\text{-}20°)}/I_{(43°\text{-}46°)}$ is greater than 0.99. In the battery of Comparative Example 2, the extraction and insertion of Li during charging and discharging may promote rearrangement of transition metals to lower Li diffusivity. This may result in a low initial discharge capacity.

As shown in Table 1, the initial discharge capacity of the battery of Example 2 is less than the initial discharge capacity of the battery of Example 1.

The reason for this may be because the battery of Example 2 has a greater integrated intensity ratio $I_{(18°\text{-}20°)}/I_{(43°\text{-}46°)}$ than the battery of Example 1. In the battery of Example 2, the extraction and insertion of Li during charging and discharging may promote rearrangement of transition metals to lower Li diffusivity. This may result in a low initial discharge capacity.

As shown in Table 1, the initial discharge capacity of the battery of Example 3 is less than the initial discharge capacity of the battery of Example 1.

The reason for this may be because the battery of Example 3 has a smaller integrated intensity ratio $I_{(18°\text{-}20°)}/I_{(43°\text{-}46°)}$ than the battery of Example 1. Thus, the Li diffusivity during charging and discharging may decrease as a result of increased amount of cation mixing. This may result in a low initial discharge capacity.

As shown in Table 1, the initial discharge capacity of the battery of Example 4 is less than the initial discharge capacity of the battery of Example 1.

The reason for this may be because the value of (x/y) in Example 4 is less than that in Example 1. This may lower the amount of Li involved in charging and discharging. For this reason, the initial discharge capacity may be low.

As shown in Table 1, the initial discharge capacity of the battery of Example 5 is less than the initial discharge capacity of the battery of Example 1.

The reason for this may be because the Mn content in Example 5 is less than that in Example 1. For this, adequate redox of oxygen may not be available. This may result in a low initial discharge capacity.

The positive electrode active material according to the present disclosure may be used as a positive electrode active material for batteries such as secondary batteries.

What is claimed is:

1. A positive electrode active material comprising:
a lithium composite oxide,
wherein the lithium composite oxide contains
first particles having a crystal structure belonging to space group R-3m, and
second particles having a crystal structure belonging to space group C2/m,
the crystal structure of the second particles has a larger amount of cation mixing than the crystal structure of the first particles,
the second particles have a smaller particle size than the first particles, and
the following mathematical formula (I) is satisfied:

$$0.05 \leq \text{integrated intensity ratio } I_{(18°\text{-}20°)}/I_{(43°\text{-}46°)} \leq 0.99 \quad (I),$$

where the integrated intensity ratio $I_{(18°\text{-}20°)}/I_{(43°\text{-}46°)}$ is a ratio of an integrated intensity $I_{(18°\text{-}20°)}$ to an integrated intensity $I_{(43°\text{-}46°)}$,
the integrated intensity $I_{(18°\text{-}20°)}$ is an integrated intensity of a first peak that is a maximum peak present in a range of angle of diffraction 2° greater than or equal to 43° and less than or equal to 46° in an X-ray diffraction pattern of the lithium composite oxide, and
the integrated intensity $I_{(18°\text{-}20°)}$ is an integrated intensity of a second peak that is a maximum peak present in a range of angle of diffraction 2θ greater than or equal to 18° and less than or equal to 20° in the X-ray diffraction pattern of the lithium composite oxide.

2. The positive electrode active material according to claim 1, wherein the integrated intensity ratio $I_{(18°-20°)}/I_{(43°-46°)}$ is greater than or equal to 0.62 and less than or equal to 0.99.

3. The positive electrode active material according to claim 1, wherein the first particles have a particle size greater than or equal to 30 nanometers.

4. The positive electrode active material according to claim 1, wherein the lithium composite oxide contains at least one selected from the group consisting of F, Cl, N, and S.

5. The positive electrode active material according to claim 4, wherein the lithium composite oxide contains F.

6. The positive electrode active material according to claim 1, wherein the lithium composite oxide further contains Mn.

7. The positive electrode active material according to claim 1, wherein the lithium composite oxide has an average composition represented by the following composition formula (I):

$$Li_xMe_yO_\alpha Q_\beta \quad (I)$$

where Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al, Q is at least one selected from the group consisting of F, Cl, N, and S, and the following four mathematical formulas are satisfied:

$$1.05 \leq x \leq 1.5,$$

$$0.6 \leq y \leq 1.0,$$

$$1.2 \leq \alpha \leq 2.0, \text{ and}$$

$$0 \leq \beta \leq 0.8.$$

8. The positive electrode active material according to claim 7, wherein Me includes at least one selected from the group consisting of Mn, Co, Ni, Fe, Cu, V, Ti, Cr, and Zn.

9. The positive electrode active material according to claim 7, wherein Me includes at least one selected from the group consisting of Mn, Co, Ni, Al, and Mg.

10. The positive electrode active material according to claim 8, wherein the Me includes Mn.

11. The positive electrode active material according to claim 10, wherein a molar ratio of Mn to Me is greater than or equal to 0.6.

12. The positive electrode active material according to claim 7, wherein Q includes F.

13. The positive electrode active material according to claim 7, wherein the following two mathematical formulas are satisfied:

$$1.166 \leq x \leq 1.4, \text{ and}$$

$$0.67 \leq y \leq 1.0.$$

14. The positive electrode active material according to claim 7, wherein the following two mathematical formulas are satisfied:

$$1.33 \leq \alpha < 2.0, \text{ and}$$

$$0 \leq \beta \leq 0.67.$$

15. The positive electrode active material according to claim 14, wherein the following two mathematical formulas are satisfied:

$$1.33 \leq \alpha \leq 1.9, \text{ and}$$

$$0.1 \leq \beta \leq 0.67.$$

16. The positive electrode active material according to claim 1, wherein the lithium composite oxide is contained as a main component in the positive electrode active material.

17. A battery comprising:
a positive electrode containing the positive electrode active material according to claim 1;
a negative electrode; and
an electrolyte.

18. The battery according to claim 17, wherein
the negative electrode contains at least one selected from the group consisting of
(i) a negative electrode active material capable of intercalating and deintercalating lithium ions, and
(ii) a material from which lithium metal dissolves into the electrolyte during discharging and on which the lithium metal deposits during charging, and
the electrolyte is a non-aqueous electrolyte solution.

19. The battery according to claim 17, wherein
the negative electrode contains at least one selected from the group consisting of
(i) a negative electrode active material capable of intercalating and deintercalating lithium ions, and
(ii) a material from which lithium metal dissolves into the electrolyte during discharging and on which the lithium metal deposits during charging, and
the electrolyte is a solid electrolyte.

* * * * *